Sept. 17, 1968          E. L. HINDMAN          3,402,287
LOAD COMPENSATING HEADLIGHT ADJUSTING MECHANISM
Filed Nov. 5, 1965          2 Sheets-Sheet 1
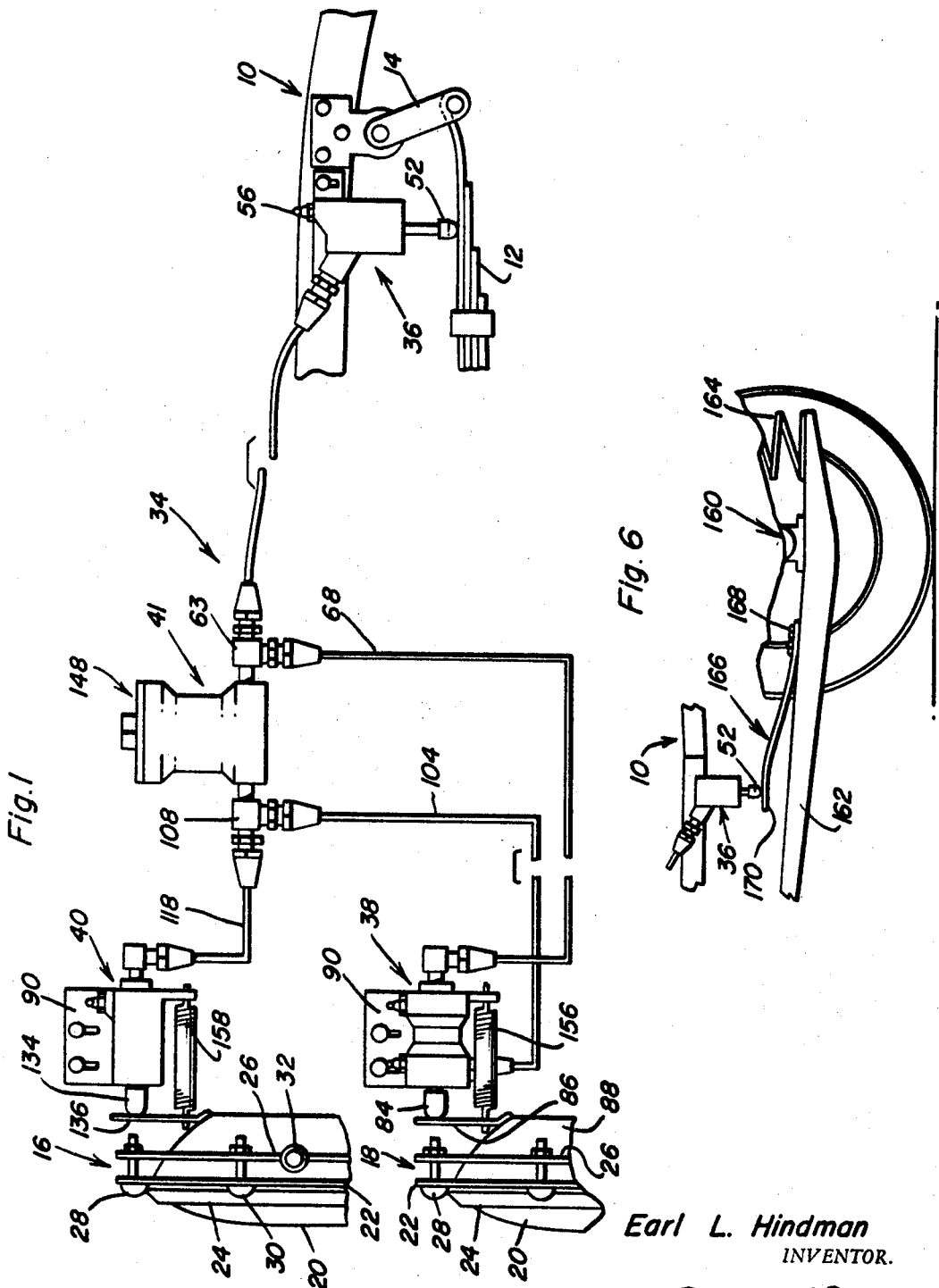
Earl L. Hindman
INVENTOR.
BY *O'Brien*
*and Jackson*
Attorneys Sept. 17, 1968   E. L. HINDMAN   3,402,287
LOAD COMPENSATING HEADLIGHT ADJUSTING MECHANISM
Filed Nov. 5, 1965   2 Sheets-Sheet 2
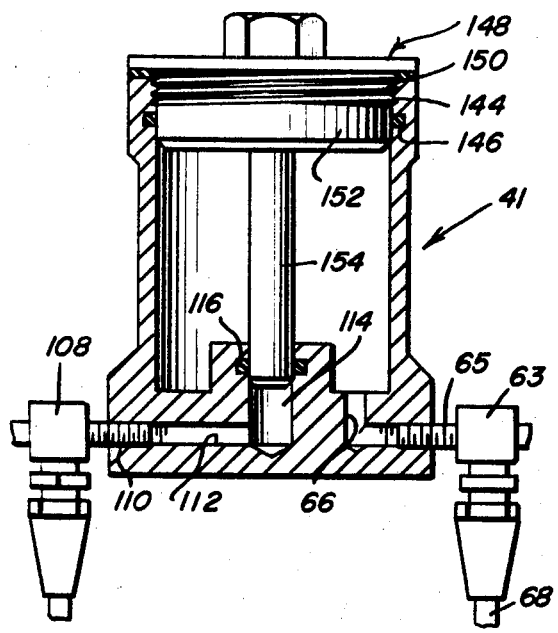
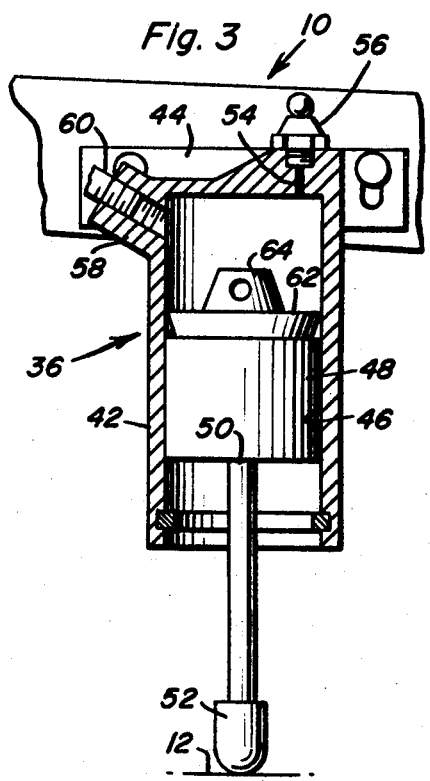
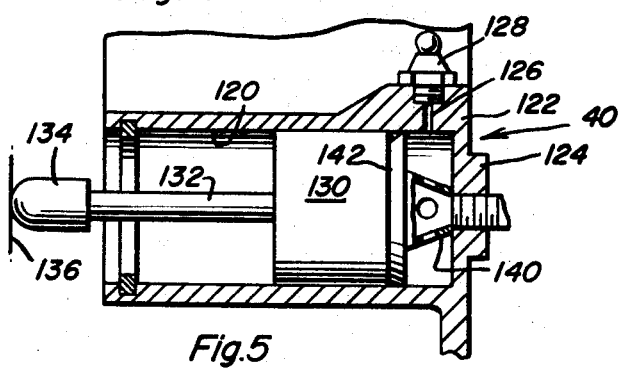
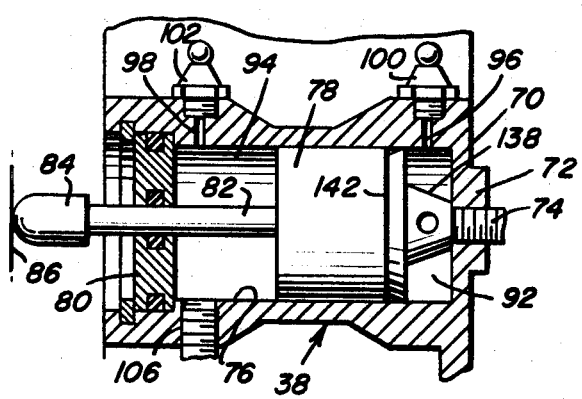
Earl L. Hindman
INVENTOR.

United States Patent Office 3,402,287
Patented Sept. 17, 1968

3,402,287
LOAD COMPENSATING HEADLIGHT
ADJUSTING MECHANISM
Earl L. Hindman, Phoenix, Ariz., assignor of twenty-five percent to Roy E. McAfee, Mesa, Ariz.
Filed Nov. 5, 1965, Ser. No. 506,561
6 Claims. (Cl. 240—7.1)

ABSTRACT OF THE DISCLOSURE

A pair of first and second adjusting fluid actuators operatively connected between corresponding first and second oscillatable headlight assemblies of a vehicle and including variable volume chambers communicated by a contained column of fluid. One of the fluid actuators includes a second chamber inversely variable in volume relative to the first chamber thereof and a controlling fluid motor communicated with the inversely variable volume chamber by a contained column of fluid.

---

This invention relates to a novel and useful vehicle load compensating headlight adjusting mechanism and more specifically to an apparatus which is designed to automatically lower the headlight beams of a vehicle by adjusting the headlight assemblies thereof as the load carried in the rear of the vehicle is increased.

There are many instances when passenger vehicles as well as commercial vehicles carry heavy loads in the rear portions thereof resulting in the rear end of the vehicle being excessively lowered while the front of the vehicle is maintained at substantially the same elevation. This changes the attitude of the vehicle from a substantially horizontally disposed position to a position having a forwardly and upwardly inclined attitude. Such a change in the attitude of a vehicle will of course change the angular relationship of headlight beams of the vehicle relative to a supporting surface on which the vehicle is disposed with the result that the headlight beams, instead of being forwardly and downwardly inclined as conventional, are horizontally disposed or even forwardly and upwardly inclined.

If the headlight beams of a vehicle are raised in this manner a potentially dangerous situation is present in that the drivers of oncoming vehicles have their nighttime vision greatly impaired by the greater glare caused by such maladjusted headlights.

While owners of vehicles that are only occasionally heavily loaded in the rear may make compensating adjustments to the headlight assemblies of such vehicles in order to compensate for the additional load being carried, some vehicles are used quite frequently to carry heavy loads or to pull trailers which place a heavy load on the rear end of a towing vehicle. This, of course, would require repeated changing of the settings of the headlight assemblies of such vehicles if their headlights were to be properly aimed at all times.

It is accordingly the main object of this invention to provide a load compensating headlight adjusting mechanism for vehicles which will automatically sense a heavy load placed in the rear of a vehicle and adjust the headlights of that vehicle in a manner compensating for the additional heavy load and maintaining the headlight beams in their proper angular relation relative to the supporting surface for the vehicle.

Another object of this invention is to provide a headlight adjusting mechanism in accordance with the immediately preceding object and including a connection with the headlight assemblies of the associated vehicle which will not interfere with normal periodic changes in the aiming of the headlight assemblies.

Yet another object of this invention is to provide a headlight adjusting mechanism constructed in a manner whereby it may be readily incorporated into the manufacture of new vehicles as well as adapted for use on many types of conventional vehicles now in use.

An ancillary object of this invention is to provide a mechanism in accordance with the preceding objects constructed in a manner whereby it may be readily serviced in order to be maintained in a condition of maximum efficiency at all times.

A final object of this invention to be specifically enumerated herein is to provide a device in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refere to like parts throughout, and in which:

FIGURE 1 is a diagrammatical view illustrating portions of the rear suspension portions and front headlight assemblies of a vehicle and the manner in which the headlight adjusting mechanism of the instant invention is operatively associated with the headlight assemblies and rear suspension portions of the vehicle in order to automatically adjust the settings of the headlight assemblies in response to the placement of a heavy load on the rear of the vehicle;

FIGURE 2 is an enlarged vertical sectional view taken substantially upon a plane passing through the liquid reservoir portion of the instant invention;

FIGURE 3 is an enlarged fragmentary vertical sectional view taken substantially upon a plane passing through the load-sensing portion of the instant invention;

FIGURES 4 and 5 are enlarged fragmentary vertical sectional views taken substantially upon planes passing through the longitudinal centerlines of the slave cylinder portions of the instant invention which effect adjustment of the associated vehicle headlight assemblies; and FIGURE 6 is a fragmentary side elevational view of a modified form of the invention illustrating an alternate method of operatively connecting the invention to the rear suspension portions of the associated vehicle.

Referring now more specifically to the drawings, the numeral 10 generally designates a frame portion of a conventional form of motor vehicle adjacent the rear thereof and from which one end of an elongated longitudinally extending leaf spring 12 is supported by means of a shackle assembly 14. It is to be noted that the other end of the leaf spring 12 may also be suitably connected to the frame 10 in a conventional manner and that a rear axle assembly (not shown) of the vehicle is supported at opposite ends from the midportions of a pair of the spring assemblies 12 supported from opposite sides of the vehicle.

The vehicle also includes a pair of headlight assemblies generally designated by the reference numerals 16 and 18. The headlight assemblies 16 and 18 each includes a light unit 20 secured to an adjustable mounting plate 22 in the conventional manner by means of a retaining rim 24. In addition, the mounting plates are adjustably supported from base plates 26 by means of conventional adjusting screws 28 and 30, the adjusting screws 28 determining the vertical positioning of the resultant headlight beams of the light units 20 and the adjusting screws 30 determining the lateral horizontal adjustment of the light units 20.

In conventional vehicles the base plates 26 are supported in substantially fixed position relative to the associated vehicle body. However, the base plates 26 in the instant invention are pivotally supported for oscillation from axle portions 32 supported in fixed position relative to the associated vehicle body and accordingly, it may be seen that the base plates 26 may be oscillated about horizontal transverse axes in order to raise and lower the resultant headlight beams independently of adjustment of the adjustment screws 28.

The axle portions 32 and the modified base plates 26 therefore comprise portions of the instant invention, the other previously mentioned structural elements being conventional in design and use.

The headlight adjusting mechanism including the modified base plates 26 and the axle portions 32, is generally designated by the reference numeral 34 and includes a first actuating cylinder assembly generally referred to by the reference numeral 36, first and second headlight adjusting slave cylinders generally referred to by the reference numerals 38 and 40, and a fluid reservoir assembly generally designated by the reference numeral 41.

With attention now invited more specifically to FIGURE 3 of the drawings, it may be seen that the actuating cylinder assembly 36 includes a cylinder portion 42 mounted on the frame 10 in any convenient manner such as by a bracket assembly 44. The cylinder portion 42 defines a bore 46 in which a piston 48 is slidably disposed. The piston 48 has the upper end of a piston rod 50 secured thereto and the lower end of the piston rod 50 projects outwardly of the lower end of the cylinder portion 42 and has a resilient abutment member 52 mounted thereon for engagement with the leaf spring 12. The upper end of the cylinder portion 42 is provided with a bleed port 54 suitably valved as at 56 and an outlet neck 58 in which one end of a pressure conduit 60 is threadedly secured. The piston 48 has a sealing cup 62 supported from its upper end and which is provided with an abutment stop 64 engageable with the upper end of the cylinder portion 42.

The pressure conduit 60 has its end remote from the neck 58 coupled to a T-fitting 63 which is communicated as at 65 with the interior of the fluid reservoir assembly 41 by means of passage 66. The T-fitting 63 has a second pressure conduit 68 communicated therewith at one end and the other end of the pressure conduit 68 opens into the cylinder portion 70 of the slave cylinder 38 through the rear wall 72 thereof as at 74.

The cylinder portion 70 defines a bore 76 in which a piston 78 is slidably disposed. The front end of the cylinder portion 70 is closed by means of a removable front wall 80 and the latter slidably receives therethrough a piston rod 82 secured to and projecting forwardly of the front face of the piston 78. The forward end of the piston rod 82 is also provided with a resilient abutment member 84 adapted to abuttingly engage a stop 86 carried by a light unit receiving shell portion 88 of the base plate 26 comprising a part of the headlight assembly 18.

The cylinder assembly 38 includes an apertured mounting bracket 90 which is secured to any suitable portion (not shown) of the body of the vehicle and the rear end of the bore 76 defines a first work chamber 92 while the front end of the bore 76 disposed forwardly of the piston 78 defines a second work chamber 94.

The cylinder portion 70 includes first and second vent ports 96 and 98 for the chambers 92 and 94, respectively, and which are suitably valved as at 100 and 102, respectively.

A third pressure conduit 104 has one end communicated with the chamber 94 as at 106 and the other end thereof is communicated with a second T-fitting 108 communicated with the interior of the reservoir 41 as at 110 by means of a passage 112 including an upstanding portion 114 defining a piston bore with which a resilient annular sealing member 116 is operatively associated.

A fourth pressure conduit 118 is communicated at one end with the T-fitting 108 and at the other end with the rear end of the bore 120 of the cylinder portion 122 comprising a part of the cylinder assembly 40. The fourth pressure conduit 118 opens through the rear wall 124 of the cylinder portion 122.

The cylinder portion 122 is also provided with a vent or bleed port 126 suitably valved as at 128 and a piston 130 is slidably disposed in the bore 120 and includes a piston rod 132 corresponding to the piston rod 82 and including a resilient abutment member 134 on its forward end which is engageable with an abutment stop 136 corresponding to the abutment stop 86.

A pair of abutments 138 and 140 similar to the abutment 64 are disposed in the rear ends of the cylinder portions 70 and 122 and each of the pistons 78 and 130 includes a sealing cup 142 which corresponds to the sealing cup 62.

The upper end of the reservoir 41 is internally threaded as at 144 and includes a sealing ring 146. A closure cap assembly generally referred to by the reference numeral 148 is provided for the reservoir 41 and includes a threaded portion 150 for threaded engagement with the reservoir 41 and a smooth cylindrical portion 152 for sealing engagement with the sealing ring 146 to close the upper end of the reservoir 41. In addition, the closure cap assembly 148 includes a depending piston rod 154 whose lower end is slidingly received in the upper end of the bore 114 and coacts with the resilient seal member 116 to close the upper end of the bore 114.

A pair of expansion springs 156 and 158 are secured between the body portions 70 and 122, respectively, and the abutment stops 86 and 136 in order to yieldingly urge rotation of the base plates 26 in a clockwise direction as viewed in FIGURE 1 of the drawings for engagement with the abutment members 84 and 134 when the latter are in their fully retracted positions and the abutments 138 and 140 are engaged with the rear walls 72 and 122.

In operation, as the load on the frame 10 is increased, the center portion of the leaf springs 12 will be raised in relation to the frame 10 whereupon the piston rod 50 will be urged upwardly from the positions illustrated in FIGURES 1 and 3 of the drawings thereby displacing the fluid within the cylinder portion 42 above the piston 48 outwardly through the pressure conduit 60 and into the rear chamber 92 of the cylinder assembly 38. This, of course, will effect forward movement of the piston 78 and cause the piston rod 82 to be extended thereby tilting the headlight assembly 18 forwardly and downwardly. Forward movement of the piston 78 will also effect an equal displacement of the fluid within the forward chamber 94 of the cylinder assembly 18 through the pressure conduit 104 and simultaneous forward movement of the piston 130 in the bore 120 thereby causing the piston rod 132 to also be extended and the light unit 20 of the headlight assembly 16 to be similarly forwardly and downwardly adjusted.

When servicing the headlight adjusting mechanism of the instant invention the closure cap 148 may be removed and any loss of fluid may be overcome by adding fluid to the reservoir 41. It is to be understood that the reservoir 41 will be located at an elevation greater than the assemblies 38 and 40 and therefore that the fluid will flow by gravity into the assemblies 38 and 40 when the valves 100, 102 and 128 are opened in order to purge all air from the systems. Then, the valves may be closed. Thereafter, the valve 56 may be opened in order to purge the cylinder assembly 36 of all air. Then, the closure cap assembly 148 may be replaced by its screw-threaded engagement with the body portion of the reservoir 41 making sure that no air is entrapped beneath the closure cap 148. Thereafter, any adjustments required in the headlight assemblies 16 and 18 may be made in the conventional manner by means of the adjusting screws 28 and 30.

The ends of the cylinder portions 42, 70 and 122 from which the piston rods 50, 82 and 132, respectively, project may be covered with suitable dust boots or the like. In addition, the cylinder assemblies 36, 38 and 40 may be vertically adjusted as will be apparent from FIGURES 1 and 3 of the drawings and it would be possible to eliminate the cylinder assembly 38 and the pressure conduits 68 and 104 if the end of the pressure conduit 118 remote from the cylinder assembly 40 were operatively connected to the T-fitting 63 in lieu of the pressure conduit 68 and the axle portion 32 of the headlight assembly 16 were made to project transversely of the associated vehicle and have the base plate of the headlight assembly 18 mounted thereon. Of course, the base plate 26 of the headlight assembly 16 would also have to be mounted on the axle portion 32 for rotation therewith.

With attention now invited to FIGURE 6 of the drawings there may be seen a modified manner of operatively connecting the cylinder assembly 36 between the frame 10 and the associated rear axle assembly generally referred to by the reference numeral 160. The rear axle assembly 160 is supported at opposite ends by means of a pair of trailing arm assemblies 162 pivotally secured at their front ends to the frame 10 in a conventional manner, coil springs 164 being disposed between the rear ends of the trailing arms 162 and the frame 10 supporting the latter from the rear axle assembly 160.

In the embodiment illustrated in FIGURE 6 a leaf spring attachment generally referred to by the reference numeral 166 is secured as at 168 to one of the trailing arms 162 and includes a raised forward end portion 170 with which the abutment member 52 of the piston rod 50 is operatively engaged. By this construction means is provided for somewhat compensating for the up-and-down movement of the axle assembly 160 relative to the frame 10 during operation of the associated vehicle. The leaf spring attachment 166 will enable the rear axle assembly 160 to move slightly up and down relative to the frame 10 without effecting a positive corresponding displacement of the piston rod 50 and thus substantially maintaining the associated headlight assemblies in their same positions of adjustment until such time as a heavy load is placed upon the rear of the associated vehicle thus moving the rear portion of the frame 10 appreciably downwardly relative to the axle assembly 160.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a vehicle of the type including a frame and forwardly directed headlight means supported for oscillation about a horizontal transverse axis and sprung wheeled suspension means mounted for vertical movement relative to the frame of said vehicle, a load compensating headlight adjusting mechanism comprising, motion-sensing means operatively connected between said frame and said suspension means, movement inducing means operatively connected between said frame and said headlight means, fluid motion transmitting means connecting said motion-sensing means to said motion-inducing means and operative to oscillate said headlight means about said axis in response to reciprocation of said suspension means relative to said frame, said headlight means including a pair of opposite side headlight assemblies each mounted for oscillation about a horizontal transverse axis, said movement inducing means being operatively connected between said frame and one of said headlight assemblies, and means operatively drivingly connecting said one headlight assembly to the other headlight assembly for similar oscillation of the latter in response to oscillation of said one headlight assembly, the last mentioned means including a first extendible fluid motor operatively connected between said other headlight assembly and said frame, said movement inducing means including a second extensible fluid motor connected between said one headlight assembly and said frame including a cylinder portion divided into a pair of variable volume chambers by a piston slidably disposed in said cylinder portion, said means drivingly connecting said one headlight to said other headlight also including a contained column of fluid communicated at its opposite ends one of said chambers and said first fluid motor of said other headlight assembly.

2. The combination of claim 1 wherein said headlight assemblies comprise headlight elements and headlight element support members, means adjustably supporting said headlight elements from said support members, said support members being those portions of said headlight assemblies mounted for oscillation about a horizontal transverse axes and said movement inducing means being operatively connected between said frame and said support members.

3. The combination of claim 1 wherein said movement sensing means comprises third elongated extensible fluid motor secured at one end to said frame and including means at the other end thereof engaged with said suspension means, said movement inducing means comprising said second extensible fluid motor said fluid motion transmitting means comprising a contained column of fluid communicated at its opposite ends with the fluid in said third fluid motor and the other of said chambers.

4. The combination of claim 3 including means communicated with said columns of fluid and the fluid in said motors operative to adjustably vary the total volume of said fluid in said motors and said columns.

5. In combination with a vehicle of the type including a frame and forwardly directed headlight means supported for oscillation about a horizontal transverse axis and sprung wheeled suspension means mounted for vertical movement relative to the frame of said vehicle, a load compensating headlight adjusting mechanism comprising, motion-sensing means operatively connected between said frame and said suspension means, movement inducing means operatively connected between said frame and said headlight means, fluid motion transmitting means connecting said motion-sensing means to said motion-inducing means and operative to oscillate said headlight means about said axis in response to reciprocation of said suspension means relative to said frame, said wheeled suspension means including an axle assembly supported from said frame by means of elongated leaf spring means, said motion-sensing means being operatively connected between said frame and a portion of said leaf spring means adjacent its connection with said frame, a portion of said leaf spring means movable relative to said frame having one end of a light-duty leaf spring connected thereto, the other end of said light-duty leaf spring being free, the portion of said motion-sensing means engaged with said leaf spring means being engaged with said free end of said light-duty leaf spring.

6. In combination with a vehicle of the type including a frame and a pair of forwardly directed headlight elements supported for oscillation about horizontal transverse axes, a headlight adjusting mechanism including a controlling fluid motor and first and second adjusting fluid actuators, said first and second fluid actuators being operatively connected between said frame and said headlight elements and including variable volume chambers communicated by a contained volume of fluid, one of said fluid actuators including a second chamber inversely variable in volume relative to the first chamber thereof, and a contained column of fluid communicating said second chamber and said controlling fluid motor.

References Cited

UNITED STATES PATENTS 2,049,802  8/1936  Hamm _____ 240—62.3
3,316,397  4/1967  Yssel _____ 240—7.1

FOREIGN PATENTS 567,968  1/1933  Germany.
953,043  1/1956  Germany.

NORTON ANSHER, Primary Examiner.
JOSEPH F. PETERS, Assistant Examiner.